July 15, 1924.

J. H. SMITH 1,501,069

PUNCTUREPROOF TIRE

Filed July 3, 1922

Inventor
John H. Smith

By Rex Frye.
Attorney

Patented July 15, 1924.

1,501,069

UNITED STATES PATENT OFFICE.

JOHN H. SMITH, OF DETROIT, MICHIGAN.

PUNCTUREPROOF TIRE.

Application filed July 3, 1922. Serial No. 572,409.

*To all whom it may concern:*

Be it known that I, JOHN H. SMITH, a subject of the King of Great Britain and Ireland, and residing at Detroit, county of Wayne, and State of Michigan, have invented a new and Improved Punctureproof Tire, of which the following is a specification.

This invention relates to tires for automobiles, bicycles and the like, and has for its principal object the provision of an air-filled tire that will not become deflated when the tire is pierced by a sharp object, such as a nail or broken glass.

Another object of my invention is the arrangement of a chamber between the tread and air-containing portion of the tire, which chamber is adapted to be filled with a viscous liquid adapted to solidify upon contact with air.

A further object of my invention is to provide in such chamber a plurality of soft blunt elements, one or more of which is adapted to be engaged by any nail, or the like, that penetrates the tire tread, and which will thereafter move with the nail toward the air tube, whereby the sharp point of the nail will be prevented from directly contacting with the air tube.

The above and other objects of my invention will be apparent from the following description wherein reference is made to the accompanying drawings illustrating preferred embodiments of my invention, and wherein similar reference numerals designate similar parts throughout the several views.

In the drawings:—

Figure 1:
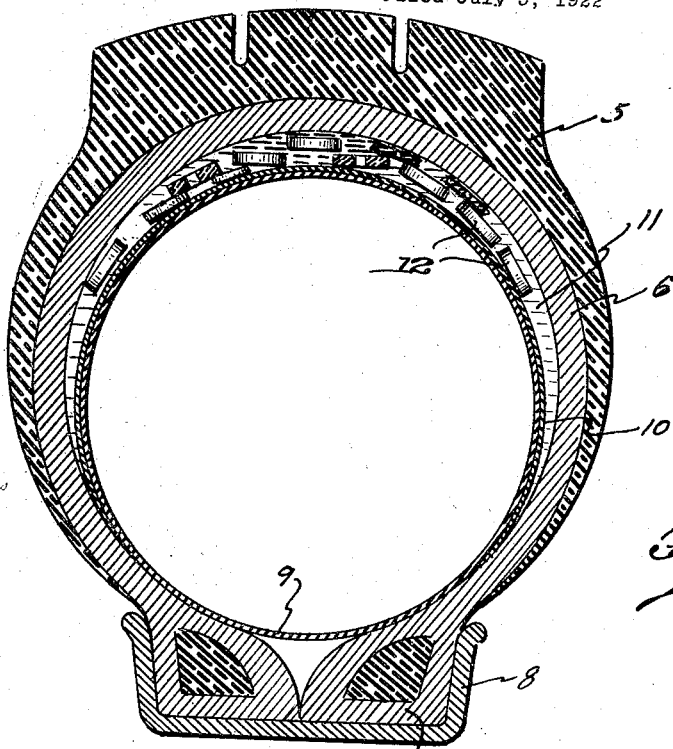
Fig. 1 is a sectional view through a tire of the usual type used for automobile wheels.

Referring now to the drawings the numeral 5 designates the tread of an automobile tire which may be constructed with a casing 6 of alternate layers of fabric and rubber or cords and rubber in the usual manner of automobile tire casings and terminating in reinforced beads 7 adapted to be held upon the rim 8. Within the casing 6 is disposed the usual inner tube 9 of comparatively thin resilient rubber adapted to be stretched by the air inflation to extend and support the tire casing in the usual manner.

Between the inner tube 9 and the innermost wall of the casing 6 I provide my puncture-resisting medium. In the embodiment illustrated in Fig. 1 a chamber is formed between the innermost wall of the casing 6 and an inner wall 10 of rubber or rubberized fabric vulcanized or otherwise secured at its edges to the casing. Within such chamber I insert a heavy viscous liquid 11 which will solidify when exposed to the air, such as melted glue or a composition having a gelatinous base. By this construction I am enabled to maintain a layer of heavy liquid behind the tire casing, which liquid will ooze slowly into any cut or aperture in the casing that reaches the outer wall of the chamber, and which will solidify upon contact of the air when it fills the cut or aperture. In this manner cuts or punctures that would ordinarily become enlarged because of contact with dirt, sand, etc., will be automatically filled up by the solidified liquid from the chamber, whereby the life of the casing will be materially increased. If a nail or the like penetrates through the casing and chamber so as to puncture the inner tube 9, the liquid from the chamber will in a similar manner effectively seal the opening in the inner tube before any great amount of air can escape from the inner tube. Thus after the nail or other puncturing object has been removed the liquid 11 will fill up the aperture made thereby in both the casing and inner tube and not only prevent the deflation of the tube but will also preserve the tire against further deterioration at that point.

Figure 3:
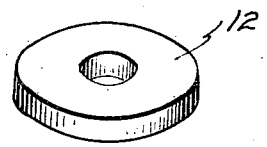
Fig. 3 is a perspective view of one of the protecting discs.

To protect the inner tube against puncture as much as possible and to provide a means for preventing a too rapid flow through an aperture or cut in the casing 6 I provide a plurality of detached semi-floating members 12 within the chamber between the inner wall of the casing and the wall 10. In the embodiment shown the members 12 are shown as apertured discs of very soft rubber (see Fig. 3) and they are inserted within the chamber in sufficient numbers to provide an overlapping condition so that it would be practically impossible for a nail or the like entering the chamber to engage the inner tube 9 without contacting one or more of the discs 12. When so contacted by the point of a nail the disc will move with the nail toward the inner tube and will serve to cover the sharp point of the nail and destroy its tearing effect for a short period of time. In practice it is believed that such resistance to puncturing the inner tube will be maintained a sufficient length of time to enable the discovery and removal of the embedded nail before the nail works its point through the rubber disc. When the nail has been removed the liquid 11 will flow from the chamber into the aperture thus formed and solidify therein. Even though the nail is not removed until after it has punctured the inner tube 9, the liquid 11 will serve to seal the aperture in the inner tube as hereinbefore described.

Another use to which the discs 12 are particularly adapted is to slow up the rate of flow of the liquid 11 into a comparatively large cut in the casing such as would be caused by a piece of broken glass or the like. When no provision is made to plug the cut, the liquid flows out of the chamber 11 in such quantities as to waste the liquid while preventing the filling up of the cut with the solidified liquid. In other words, the rate of flow is too great to permit the liquid to solidify. To prevent this one or more of the discs 12 bridges the inner extremity of the cut in the casing and prevents the rapid escape of the liquid 11. The liquid will, however, ooze through and around the discs 12 at a comparatively slow rate and will thereupon solidify and slowly fill the cut.

Figure 2:
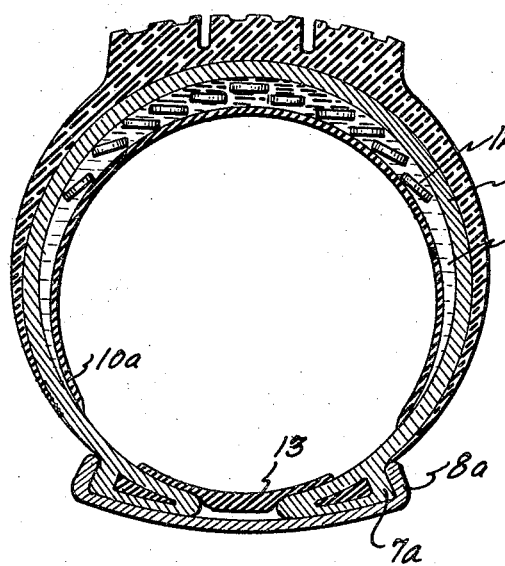
Fig. 2 is a similar view of a single tube tire such as is often used for bicycles.

In Fig. 2 is shown a modification showing a single tube form of tire such as is often used with bicycles and the like, and comprises a casing $6^a$ terminating at its inner extremities in beads $7^a$ adapted for use with a clincher rim $8^a$. No inner tube is employed with this construction but the space between the beads $7^a$ is filled by a strip 13 of pliable rubber vulcanized or otherwise secured at its sides to the beads $7^a$. Between the innermost wall of the casing $6^a$ and a wall $10^a$ of rubber or rubberized fabric, I introduce the liquid $11^a$ and soft rubber discs $12^a$, substantially as described in connection with the modification illustrated in Fig. 1. Whenever the outer wall of the casing is pierced by a nail or the like, the liquid $11^a$ will serve to fill up the perforation and seal the tire to prevent further deterioration. No air can escape from within the tire until the inner wall $10^a$ is pierced, and if this should happen the air can only escape by passing through the liquid $11^a$. The solidification of the liquid will effectively prevent such escape. The discs $12^a$ have the same double function as hereinbefore described in connection with the embodiment illustrated in Fig. 1.

The arrangement of the pliable member 13 between the beads $7^a$ permits the movement of one bead relatively to the other to facilitate the assembly of the tire upon the clincher rim.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim:—

1. A tire having a casing and an air-containing portion within the casing, a wall spaced from the interior of the casing, a heavy viscous liquid arranged within such space and adapted to solidify upon contact with air, and a plurality of members of soft rubber within the liquid.

2. A tire having a casing, a wall secured adjacent its edges to the inner wall of the casing and at other points spaced from the casing to form a chamber, a viscous liquid contained in said chamber and adapted to solidify when in contact with air, a plurality of apertured discs of soft rubber arranged within the chamber, and means for holding air under pressure within the casing on the opposite side of said wall from said chamber.

In witness whereof I hereunto set my hand.

JOHN H. SMITH.

Witnesses:
REX FRYE,
C. M. CUMMINGS.